US012112692B2

(12) United States Patent
Li et al.

(10) Patent No.: US 12,112,692 B2
(45) Date of Patent: Oct. 8, 2024

(54) PIXEL DRIVE CIRCUIT, DRIVING METHOD, AND DISPLAY PANEL

(71) Applicant: HKC CORPORATION LIMITED, Shenzhen (CN)

(72) Inventors: Zeyao Li, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/213,267

(22) Filed: Jun. 23, 2023

(65) Prior Publication Data

US 2024/0153442 A1 May 9, 2024

(30) Foreign Application Priority Data

Nov. 9, 2022 (CN) ........................ 202211401508.3

(51) Int. Cl.
*G09G 3/32* (2016.01)

(52) U.S. Cl.
CPC ....... *G09G 3/32* (2013.01); *G09G 2300/0852* (2013.01); *G09G 2310/0262* (2013.01);
(Continued)

(58) Field of Classification Search
CPC . G09G 3/2003–204; G09G 3/32–3291; G09G 2300/0809; G09G 2300/0814;
(Continued)

(56) References Cited

U.S. PATENT DOCUMENTS 11,798,470 B1 * 10/2023 Li ........................ G09G 3/2011
2014/0333686 A1 * 11/2014 Kim ..................... G09G 3/3233
345/82

(Continued)

FOREIGN PATENT DOCUMENTS

CN 110021264 A 7/2019
CN 111477162 A 7/2020

(Continued)

OTHER PUBLICATIONS

Chinese First Office Action, Chinese Application No. 202211401508.3, mailed Feb. 3, 2023 (16 pages).

(Continued)

*Primary Examiner* — Nathan Danielsen

(57) ABSTRACT

Disclosed are a pixel drive circuit, a driving method, and a display panel. The pixel drive circuit includes a light-emitting element; a power supply line, including a high-potential power supply and a low-potential power supply, connected to the light-emitting element; a pulse amplitude modulation unit, including a first drive transistor connected to the light-emitting element and the power supply line; wherein a driving current with different amplitudes is provided to the light-emitting element according to a voltage applied to a gate of the first drive transistor; and a pulse width modulation unit, including a second drive transistor connected to the light-emitting element and the pulse amplitude modulation unit; wherein a duration of the driving current of the light-emitting element is controlled according to a voltage applied to a gate of the second drive transistor.

20 Claims, 9 Drawing Sheets

(52) U.S. Cl.
CPC . *G09G 2310/08* (2013.01); *G09G 2320/0633* (2013.01); *G09G 2320/064* (2013.01); *G09G 2330/021* (2013.01)

(58) Field of Classification Search
CPC ... G09G 2300/0842; G09G 2300/0852; G09G 2300/0861; G09G 2300/0866; G09G 2300/0876; G09G 2310/0243; G09G 2310/0262; G09G 2310/027; G09G 2310/0272; G09G 2310/06; G09G 2310/066; G09G 2310/08; G09G 2320/0233; G09G 2320/0242; G09G 2320/029; G09G 2320/0295; G09G 2320/043; G09G 2320/045; G09G 2320/0626–064; G09G 2320/0693; G09G 2330/021
See application file for complete search history.

(56) References Cited

U.S. PATENT DOCUMENTS

| | | | | |
|---|---|---|---|---|
| 2019/0371232 | A1* | 12/2019 | Kim | G09G 3/2011 |
| 2022/0114951 | A1* | 4/2022 | Chang | G09G 3/2007 |

FOREIGN PATENT DOCUMENTS

| | | | |
|---|---|---|---|
| CN | 111477163 | A | 7/2020 |
| CN | 111477164 | A | 7/2020 |
| CN | 112767874 | A | 5/2021 |
| CN | 112768478 | A | 5/2021 |
| CN | 112837649 | A | 5/2021 |
| CN | 112927651 | A | 6/2021 |
| CN | 113168808 | A | 7/2021 |
| CN | 113396452 | A | 9/2021 |
| CN | 113434052 | A | 9/2021 |
| CN | 113674680 | A | 11/2021 |
| CN | 113889039 | A | 1/2022 |
| CN | 114299864 | A | 4/2022 |
| CN | 114333685 | A | 4/2022 |
| CN | 14519980 | A | 5/2022 |
| CN | 112927651 | B | 5/2022 |
| CN | 114566115 | A | 5/2022 |
| CN | 114783358 | A | 7/2022 |
| CN | 115662343 | A | 1/2023 |
| KR | 20030044566 | A | 6/2003 |

OTHER PUBLICATIONS

Notification to Grant Patent Right for Invention, Chinese Application No. 202211401508.3, mailed Feb. 25, 2023 (4 pages).
International Search Report, International Application No. PCT/CN2023/094634, mailed Aug. 1, 2023 (15 pages).

* cited by examiner

PIXEL DRIVE CIRCUIT, DRIVING METHOD, AND DISPLAY PANEL

CROSS REFERENCE

The present application claims priority of China Patent Application No. 202211401508.3 filed on Nov. 9, 2022, the entire contents of which are hereby incorporated by reference.

TECHNICAL FIELD

The present disclosure relates to the field of display panels, and in particular to a pixel drive circuit, a driving method, and a display panel.

BACKGROUND

Currently, inorganic micro light emitting diode (Micro LED) displays are one of the hot spots in display research.

Compared with OLED displays, Micro LEDs have the advantages of high reliability, low power consumption, high brightness, and fast response time, etc. Among them, the drive circuit for controlling the LED light emission is the core technology of Micro LED display and has important research significance.

However, since the luminous efficiency of LEDs varies greatly under different driving currents, in order to reduce the power consumption of Micro LED displays, it is necessary to maintain the LEDs working at relatively high currents for keeping the LEDs always in a high-efficiency operating range.

SUMMARY OF THE DISCLOSURE

The main technical problem solved by the present disclosure is to provide a pixel drive circuit and its driving method, and a display panel to realize the light-emitting element to maintain in a high-efficiency working range.

To solve the above technical problem, the present disclosure provides a pixel drive circuit, including: a light-emitting element; a power supply line, including a high-potential power supply and a low-potential power supply, connected to the light-emitting element; a pulse amplitude modulation unit, including a first drive transistor connected to the light-emitting element and the power supply line; wherein a driving current with different amplitudes is provided to the light-emitting element according to a voltage applied to a gate of the first drive transistor; and a pulse width modulation unit, including a second drive transistor connected to the light-emitting element and the pulse amplitude modulation unit; wherein a duration of the driving current of the light-emitting element is controlled according to a voltage applied to a gate of the second drive transistor.

In some embodiments, a source of the first drive transistor is connected to the power supply line, a drain of the first drive transistor is connected to a source of the second drive transistor, and a drain of the second drive transistor is connected to the light-emitting element.

In some embodiments, the pixel drive circuit further includes a driving current detection unit connected to the drain of the first drive transistor and configured to detect a driving current of the first drive transistor; wherein the driving current detection unit includes a first switch transistor; a source of the first switch transistor is connected to the drain of the first drive transistor, a drain of the first switch transistor is connected to a measurement line, and a gate of the first switch transistor is connected to a scan control line.

In some embodiments, the pulse width modulation unit further includes a first transistor, a second transistor, a third transistor, a fourth transistor, a first capacitor, and a second capacitor; a first pole plate of the first capacitor is connected to the gate of the second drive transistor, and a second pole plate of the first capacitor is connected to the power supply line; a source of the first transistor is connected to a first signal line, a drain of the first transistor is connected to the gate of the second drive transistor, and a gate of the first transistor is connected to a first scan control line; a source of the second transistor is connected to a second signal line, a drain of the second transistor is connected to the gate of the second drive transistor, and a gate of the second transistor is connected to a drain of the third transistor and to a first pole plate of the second capacitor; a source of the third transistor is connected to a third signal line, the drain of the third transistor is connected to the gate of the second transistor and to the first pole plate of the second capacitor, and a gate of the third transistor is connected to a second scan control line; a source of the fourth transistor is connected to a control signal line, a drain of the fourth transistor is connected to a second pole plate of the second capacitor, and a gate of the fourth transistor is connected to a third scan control line.

In some embodiments, the pulse width modulation unit further includes a fifth transistor connected in parallel with the first transistor to control a gate voltage of the second drive transistor; wherein a source of the fifth transistor is connected to the first signal line, a drain of the fifth transistor is connected to the gate of the second drive transistor, and a gate of the fifth transistor is connected to the second scan control line, for maintaining an initial voltage of the gate of the second drive transistor.

In some embodiments, the pixel drive circuit further includes a control unit connected to the light-emitting element and the power supply line, for controlling connection or disconnection of the light-emitting element; wherein the control unit includes a second switch transistor; a source of the second switch transistor is connected to the drain of the second drive transistor, a drain of the second switch transistor is connected to the light-emitting element, and a gate of the second switch transistor is connected to a fourth scan control line.

In some embodiments, the pulse amplitude modulation unit further includes a sixth transistor and a third capacitor; a source of the sixth transistor is connected to a data line, a drain of the sixth transistor is connected to a gate of the first drive transistor and to a first pole plate of the third capacitor, and a gate of the sixth transistor is connected to the first scan control line; a second pole plate of the second capacitor is connected to the power supply line.

In some embodiments, each of the first drive transistor, second drive transistor, first transistor, second transistor, third transistor, fourth transistor, fifth transistor, sixth transistor, first switch transistor, and second switch transistor is an N-type transistor or a P-type transistor.

The present disclosure provides a driving method of the pixel drive circuit; wherein the driving method includes: a first stage, where the first scan control line of an Nth row controls the sixth transistor and the first transistor to be turned on, a data voltage of the data line is transmitted through the sixth transistor to the first pole plate of the third capacitor and the gate of the first drive transistor, and the data voltage is maintained through the third capacitor to achieve an amplitude setting of a driving current of the first drive transistor; a first voltage of the first signal line is transmitted through the first transistor to the gate of the second drive transistor and to the first pole plate of the first capacitor, and the first voltage is maintained through the first capacitor to keep the second drive transistor in a turned-off state; a second stage, where the second scan control line of an Nth row controls the third transistor to be turned on, and a third voltage of the third signal line is transmitted through the third transistor to the gate of the second transistor and the first pole plate of the second capacitor, to keep the second transistor turned off; the third scan control line controls the fourth transistor to be turned on, and a first level voltage of the control signal line is written to the second pole plate of the second capacitor through the fourth transistor and transmitted to the gate of the second transistor through a coupling effect of the second capacitor; a third stage, where the third scan control line of an Nth row controls the fourth transistor to be turned on, and a second level voltage of the control signal line is written to the second pole plate of the second capacitor through the fourth transistor and transmitted to the gate of the second transistor through the coupling effect of the second capacitor, to turn off the second transistor; and a fourth stage, the third scan control lines of all rows control the fourth transistor to be turned on, and a swing voltage of the control signal line is transmitted through the fourth transistor to the gate of the second transistor to control the second transistor to be turned on; a second voltage of the second signal line is transmitted through the second transistor to the gate of the second drive transistor to control the second drive transistor to be turned on; wherein a turned-on time of the second transistor is controlled through the swing voltage, and a turned-on time of the second drive transistor is controlled, thereby controlling a light-emitting time of the light emitting element.

In some embodiments, the second transistor is a P-type transistor, and the swing voltage is a uniformly falling voltage; the light-emitting time is related to a decreasing slope of the swing voltage.

In some embodiments, the second transistor is an N-type transistor, and the swing voltage is a uniformly rising voltage.

In some embodiments, in the second or third stage, the scan control line of the Nth row further controls the first switching transistor to be turned on, causing the drain of the first drive transistor to form a path with a measurement line, for measuring the driving current of the first drive transistor.

In some embodiments, the scan control line is the second scan control line or the third scan control line.

In some embodiments, in the second stage, the second scan control line of the Nth row further controls the fifth transistor to be turned on, and the first voltage of the first signal line is transmitted to the first pole plate of the first capacitor and to the gate of the second drive transistor, keeping a gate voltage of the second drive transistor constant.

In some embodiments, in the fourth stage, the fourth scan control line controls the second switch transistor to be turned on, enabling the power supply line to form a path with the light-emitting element and causing the light-emitting element to emit light.

The present disclosure further provides a display panel, including a plurality of pixel cells arranged in an array; wherein each pixel cell is arranged with the pixel drive circuit as above.

The beneficial effect of the present disclosure is that the gate voltage of the first drive transistor of the pulse amplitude modulation unit is controlled by the transistor and control line to modulate the driving current of the light-emitting element, and the gate voltage of the second drive transistor of the pulse amplitude modulation unit is controlled to modulate the light-emitting time of the light-emitting element. The present disclosure realizes PWM modulation and PAM modulation by controlling the gate voltages of the two TFTs separately, such that the light-emitting element can always be in a high-efficiency operating range and the cutting of gray scale can be easily realized.

BRIEF DESCRIPTION OF THE DRAWINGS

In order to illustrate the technical solutions more clearly in the embodiments of the present disclosure, the following will briefly describe the accompanying drawings required in the description of the embodiments, and it is obvious that the following description of the accompanying drawings are only some of the embodiments of the present disclosure. For those skilled in the art, other accompanying drawings may be obtained from these drawings without creative labor.

NUMERAL REFERENCE

Figure 1:
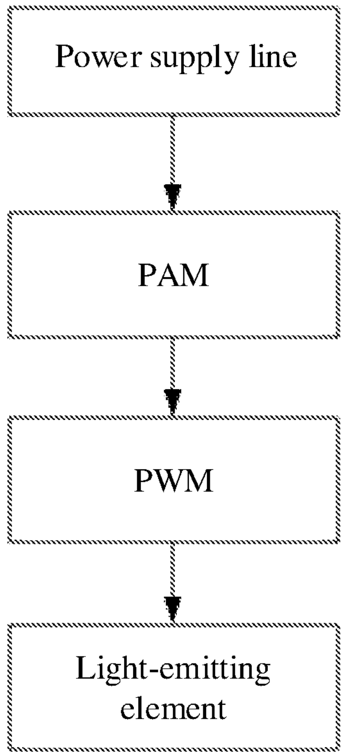
FIG. 1 is a structural block view of a pixel drive circuit according to an embodiment of the present disclosure.

T1, sixth transistor; T2, first drive transistor; T3, first switch transistor; T4, second drive transistor; T5, fourth transistor; T6, third transistor; T7, second transistor; T8, first transistor; T9, fifth transistor; T10, second switch transistor; scan1, first scan control line; scan2, second scan control line; scan3, third scan control line; EM, fourth scan control line; VDD, high-potential power supply line; VSS, low-potential power supply line; LED, light-emitting element; gh1, first signal line; g1, second signal line; gh2, third signal line; C1, third capacitor; C2, first capacitor; C3, second capacitor; data, data line; detect, measurement line; 100, pixel unit.

DETAILED DESCRIPTION

The following will be a clear and complete description of the technical solutions in the embodiments of the present disclosure, in conjunction with the accompanying drawings in the embodiments of the present disclosure. Obviously, the described embodiments are only a part of the embodiments of the present disclosure, and not all of them. Based on the embodiments in the present disclosure, all other embodiments obtained by those skilled in the art without making creative labor fall within the scope of the present disclosure.

The terms used in the embodiments of the present disclosure are intended solely for the purpose of describing particular embodiments and are not intended to limit the present disclosure. The singular forms of "one", "said", and "the" as used in the embodiments of the present disclosure and the appended claims are also intended to include plural forms, unless clearly indicated above. Unless other meanings are clearly indicated above, "a plurality" generally includes at least two, but does not exclude the inclusion of at least one.

It should be understood that the term "and/or" as used herein is simply a description of the association of related objects, indicating that three relationships can exist, e.g., A and/or B, which can mean: A alone, both A and B, and B alone. In addition, the character "/" in this document generally indicates that the associated objects before and after are in an "or" relationship. The terms "first", "second", etc. in the specification, claims, and the above-mentioned drawings of the present disclosure are used to distinguish similar objects, and need not be used to describe a specific order or sequence.

It is to be understood that the term "including", "comprising", or any other variation thereof, as used herein, is intended to cover non-exclusive inclusion such that a process, method, article, or apparatus including a series of elements includes not only those elements, but may further include other elements not expressly listed, and may further include elements that are inherent to such process, method, article, or apparatus. Without further limitation, the elements defined by the statement "including" do not preclude the existence of additional identical elements in the process, method, article, or apparatus that include said elements.

It should be noted that when there are directional indications (such as up, down, left, right, forward, backward) in the present disclosure, the directional indications are intended only to explain the relative positions, movements, etc. of components in a particular posture (as shown in the accompanying drawings), and if that particular posture is changed, the directional indications are also changed accordingly.

References herein to "embodiments" mean that particular features, structures, or characteristics described in connection with the embodiments may be included in at least one embodiment of the present disclosure. The presence of the phrase at each location in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

The present disclosure provides a pixel drive circuit. Referring to FIG. 1, FIG. 1 is a structural block view of a pixel drive circuit according to an embodiment of the present disclosure. As shown in FIG. 1, the pixel drive circuit includes: a light-emitting element, a power supply line, a pulse amplitude modulation unit (PAM), and a pulse width modulation unit (PWM).

The power supply line includes a high-potential power supply line VDD and a low-potential power supply line VSS. The power flows through the high-potential power supply line VDD, through the light-emitting element, and then to the low-potential power supply line VSS. The low-potential power supply line VSS may be grounded and is not limited herein. In the embodiments, the power supply line refers to the high-potential power supply line VDD.

In the embodiments, the power supply line and the light-emitting element are connected by the pulse amplitude modulation unit and the pulse width modulation unit. The driving current of the light-emitting element is adjusted by the pulse amplitude modulation unit, and the light-emitting time of the light-emitting element is adjusted by the pulse width modulation unit.

Specifically, the pulse amplitude modulation unit includes a first drive transistor; a source of the first drive transistor is connected to the high-potential power supply line, a drain of the first drive transistor is connected to the light-emitting element, and the driving current is provided to the light-emitting element with different amplitudes according to the voltage applied to a gate of the first drive transistor. That is, the magnitude of the current flowing through the source/drain of the first drive transistor is controlled by controlling the gate voltage of the first drive transistor. Among them, the driving current $I=\frac{1}{2}\mu CW/L(V_{GS}-V_{th})^2$, where $V_{GS}$ is the gate source voltage of the first drive transistor and $V_{th}$ is a threshold voltage for turning on the first drive transistor. The driving current is also the driving current flowing through the light-emitting element, and the driving current is related to the luminous brightness of the light-emitting element.

The pulse width modulation unit includes a second drive transistor; a source of the second drive transistor is connected to the drain of the first drive transistor, and a drain of the second drive transistor is connected to the light-emitting element to connect the pulse amplitude modulation unit and the light-emitting element. The pulse width modulation unit controls the turned-on time of the second drive transistor based on adjusting the voltage applied to the gate of the second drive transistor, thereby controlling the duration of the driving current flowing through the light-emitting element, that is, controlling the light-emitting duration of the light-emitting element. In the embodiments, the pulse width modulation unit and the pulse amplitude modulation unit are connected in series.

In other embodiments, the pulse amplitude modulation unit and pulse width modulation unit may be swapped in order, without limitation here.

The beneficial effect of the present embodiments is that the driving current and light-emitting time of the light-emitting element are controlled by the first drive transistor and the second drive transistor, respectively, such that the driving current and light-emitting time of the light-emitting element can be controlled by controlling the gate voltage of the first transistor and the second transistor, respectively, which is convenient to control and adjust.

Figure 2:
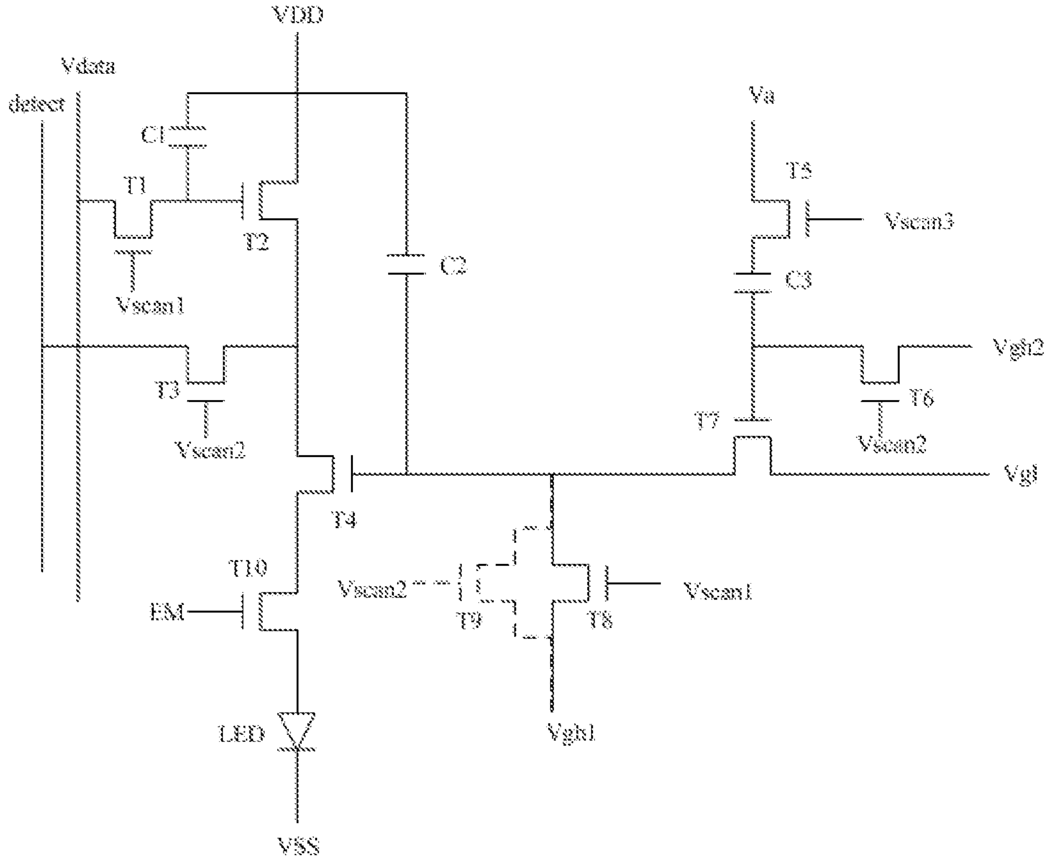
FIG. 2 is a structural schematic view of a pixel drive circuit according to a first embodiment of the present disclosure.

The present disclosure further provides a specific circuit structure of the first pixel drive circuit. Specifically, referring to FIG. 2, FIG. 2 is a structural schematic view of a pixel drive circuit according to a first embodiment of the present disclosure. As shown in FIG. 2, specifically, the pulse width modulation unit (PWM) further includes a first transistor T8, a second transistor T7, a third transistor T6, a fourth transistor T5, a first capacitor C2, and a second capacitor C3.

A first pole plate of the first capacitor C2 is connected to the gate of the second drive transistor T4, and a second pole plate of the first capacitor C2 is connected to the high-potential power supply line VDD.

A source of the first transistor T8 is connected to a first signal line gh1, a drain of the first transistor T8 is connected to the gate of the second drive transistor T4 and to the first pole plate of the first capacitor C2, and a gate of the first transistor T8 is connected to a first scan control line scant. The first transistor T8 can charge a first voltage gh1 to the gate of the second drive transistor T4 and the first voltage gh1 is maintained through the first pole plate of the first capacitor C2. The first voltage gh1 is configured to turn off the second drive transistor T4.

A source of the second transistor T7 is connected to a second signal line g1, a drain of the second transistor T7 is connected to the gate of the second drive transistor T4, and a gate of the second transistor T7 is connected to a drain of the third transistor T6 and to a first pole plate of the second capacitor C3.

A source of the third transistor T6 is connected to a third signal line gh2, the drain of the third transistor T6 is connected to the gate of the second transistor T7, and a gate of the third transistor T6 is connected to a second scan control line scant and to the first pole plate of the second capacitor C3.

A source of the fourth transistor T5 is connected to a control signal line a, a drain of the fourth transistor T5 is connected to a second pole plate of the second capacitor C3, and a gate of the fourth transistor T5 is connected to a third scan control line scan3. The voltage of the gate of the second transistor T7 is adjusted by the third transistor T6 and the fourth transistor T5 cooperatively.

In the embodiments, an initial voltage is charged to the gate of the second drive transistor T4 through the first transistor T8 to ensure that the second drive transistor T4 is turned off, and the gate voltage of the second transistor T7 is controlled to control turning on the second transistor T7, such that the gate of the second drive transistor T4 is charged with a turning-on voltage through the second transistor T7 to enable the second drive transistor T4 to turn on, and the turned-on time of the second drive transistor T4 is controlled to control the light-emitting time of the light-emitting element LED.

In a specific embodiment, to prevent the gate voltage of the second drive transistor T4 from changing caused by the second transistor T7 being accidentally turned on when the voltage at the gate of the second transistor T7 is modulated, a fifth transistor T9 is connected in series with the gate of the second drive transistor T4. The fifth transistor T9 is connected in parallel with the first transistor T8 to control the gate voltage of the second drive transistor during the charging process.

In other embodiments, since a change in the voltage of the third transistor T6 and the fourth transistor T5 does not necessarily cause the second transistor T7 to be turned on, the fifth transistor T9 may be omitted.

In the embodiments, further, in order to prevent the light-emitting element LED emitting light caused by the second drive transistor T4 being turned on in the charging process, a control unit is arranged between the light-emitting element and the power supply line for controlling connection or disconnection between the light-emitting element and the power supply line. The control unit may be connected at any position between the power supply line and the light-emitting element. In the embodiments, the control unit is connected between the pulse width modulation unit and the light-emitting element LED. In other embodiments, the control unit may be connected between the pulse amplitude modulation unit and the pulse width modulation unit, without limitation herein.

In the embodiments, the control unit includes a second switch transistor T10; a source of the second switch transistor T10 is connected to the drain of the second drive transistor T4, a drain of the second switch transistor T10 is connected to the light-emitting element LED, and a gate of the second switch transistor T10 is connected to a fourth scan control line EM. In the embodiments, since the path of the light-emitting element is controlled by the second switch transistor T10, the light-emitting element will not be caused to emit light even if the second drive transistor T4 is turned on during a non-light-emitting stage. In the embodiments, the fifth transistor T9 may be omitted, as shown in FIG. 2, with the fifth transistor T9 illustrated in broken lines. In the embodiments, the control unit can not only avoid accidental conduction of the light-emitting element LED, but also control the light-emitting element LED off.

In the embodiments, the pulse amplitude modulation unit includes a first drive transistor T2, a sixth transistor T1, and a third capacitor C1. Specifically, a source of the sixth transistor T1 is connected to a data line data, a drain of the sixth transistor T1 is connected to a gate of the first drive transistor T2 and to a first pole plate of the third capacitor C1, and a gate of the sixth transistor T1 is connected to the first scan control line scant. The sixth transistor T1 can charge a data voltage to the first drive transistor T2 to turn on the first drive transistor T2, and the data voltage is maintained through the third capacitor C1, such that the first drive transistor T2 is always in the turned-on state. The gate voltage of the first drive transistor T2 is controlled by controlling the magnitude of the data voltage, thereby controlling the driving current.

In the embodiments, the pulse amplitude modulation unit may compensate directly the voltage to the gate of the first drive transistor T2 through the data line data. In other embodiments, the pulse amplitude modulation unit may be other internal compensation structures for compensation, which will not be described in detail herein.

In the embodiments, the pixel drive circuit further includes a driving current detection unit, arranged between the pulse amplitude modulation unit and the pulse width modulation unit, to detect the driving current of the pulse amplitude modulation unit when the second drive transistor of the pulse width modulation unit is turned off. Specifically, an end of the driving current detection unit is connected to the drain of the first drive transistor of the pulse amplitude modulation unit, and the other end is connected to the data line data through a measurement line, for detecting the driving current of the first drive transistor and subsequently compensating the data line data, thereby achieving amplitude control of the driving current.

Specifically, the driving current detection unit includes a first switch transistor T3; a source of the first switch transistor T3 is connected to the drain of the first drive transistor T2, a drain of the first switch transistor T3 is connected to the measurement line detect, and a gate of the first switch transistor T3 is connected to a scan control line. The scan control line controls to turn on the first switch transistor T3. In the embodiments, the scan control line is the second scan control line scan2 to control to turn on the first switch transistor T3 in a second stage, thereby achieving the measurement of the driving current. The measurement line detect is connected to a timing controller to facilitate compensation of the data line data at a subsequent stage. The first switch transistor T3 and the third transistor T6 share the second scan control line scan2, which enables the detection of the driving current and avoids adding more alignments. In other embodiments, the scan control line is the third scan control line scan3, which will not be limited herein.

In the embodiments, T1, T2, T3, T4, T5, T6, T7, T8, T9, T10 in the pixel drive circuit are each a low-potential conduction P-type transistor. In other embodiments, T1, T2, T3, T4, T5, T6, T7, T8, T9, T10 may all be N-type transistors with high potential conduction, or form a mixed drive circuit with some transistors being P-type and some transistors being N-type, which will not be limited herein.

The following is an example of a driving method in which T1, T2, T3, T4, T5, T6, T7, T8, and T10 are all P-type transistors with low potential conduction.

Figure 3:
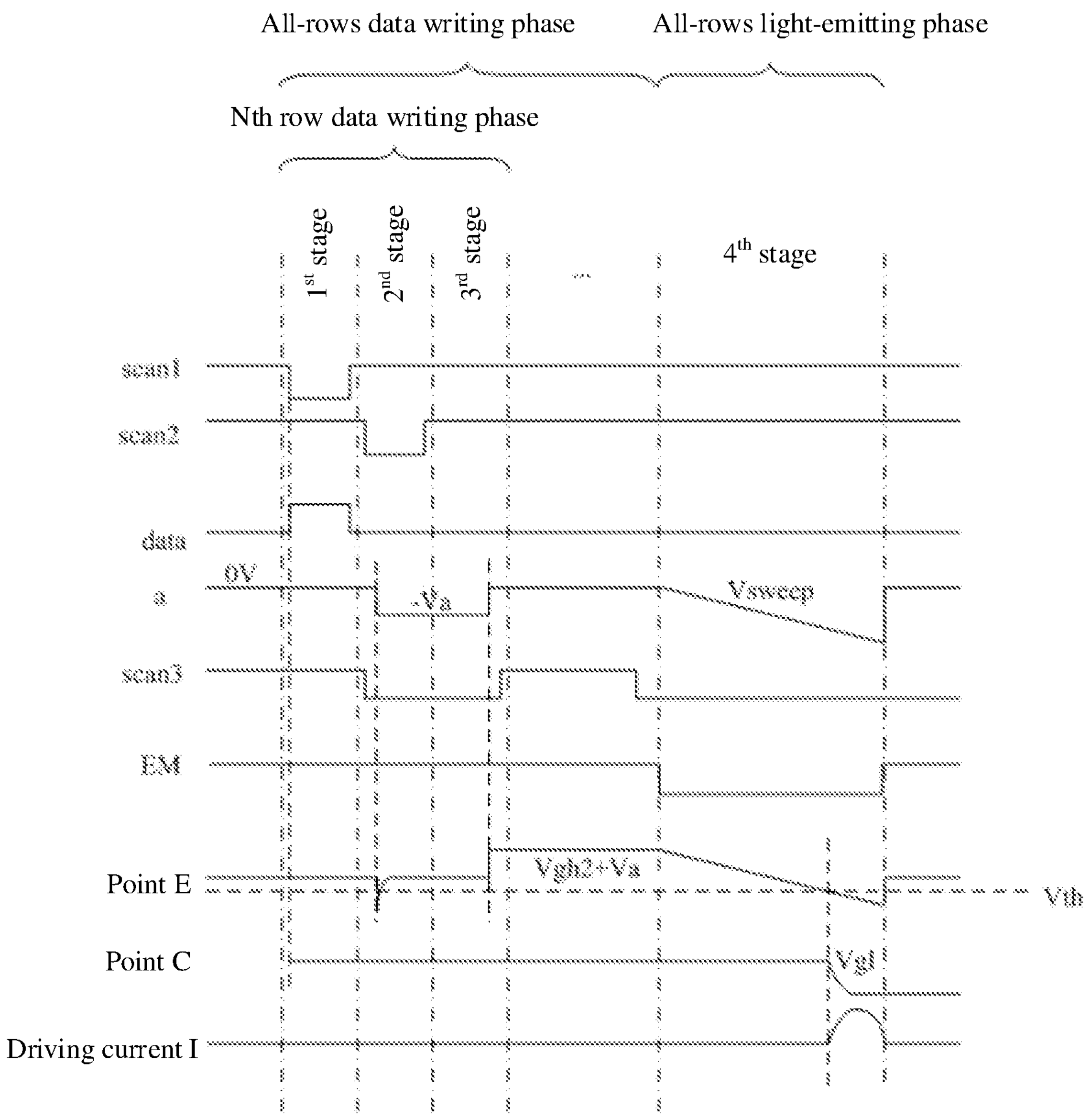
FIG. 3 is a timing diagram of drive signals of a pixel drive circuit according to an embodiment of the present disclosure.

The present disclosure provides a first driving method according to the structure of the pixel driving transistor of the first embodiment. Specifically, referring to FIG. 3, FIG. 3 is a timing diagram of drive signals of a pixel drive circuit according to an embodiment of the present disclosure. As shown in FIG. 3, the driving method of the pixel drive circuit includes: a first stage, a second stage, a third stage, and a fourth stage. The first stage, the second stage, and the third stage are data writing stages, where writing is performed in accordance with each row, and in other embodiments, they writing is performed in accordance with each column, which are not limited herein. The fourth stage is an all-row light-emitting stage, which is entered when the data writing of pixels in all rows is completed.

In the first stage, the first scan control line of an Nth row controls the sixth transistor T1 and the first transistor T8 to be turned on, the data voltage Vdata of the data line data is transmitted through the sixth transistor T1 to the first pole plate of the third capacitor C1 and the gate of the first drive transistor T2, and the data voltage Vdata is maintained through the third capacitor C1 to achieve the amplitude setting of the driving current of the first drive transistor T2. In addition, the first voltage Vgh1 of the first signal line gh1 is transmitted through the first transistor T8 to the gate of the second drive transistor T4 and to the first pole plate of the first capacitor C2, and the first voltage Vgh1 is maintained through the first capacitor C2 to keep the second drive transistor T4 in a turned-off state. The first voltage Vgh1 shall be a positive voltage to make the second drive transistor T4, which is turned on at a low level, turned off. Obviously, when the second drive transistor T4 is negative, the first voltage Vgh1 shall be negative, which is not limited herein. The first voltage Vgh1 is of a value that makes the second drive transistor T4 turned off.

Figure 4:
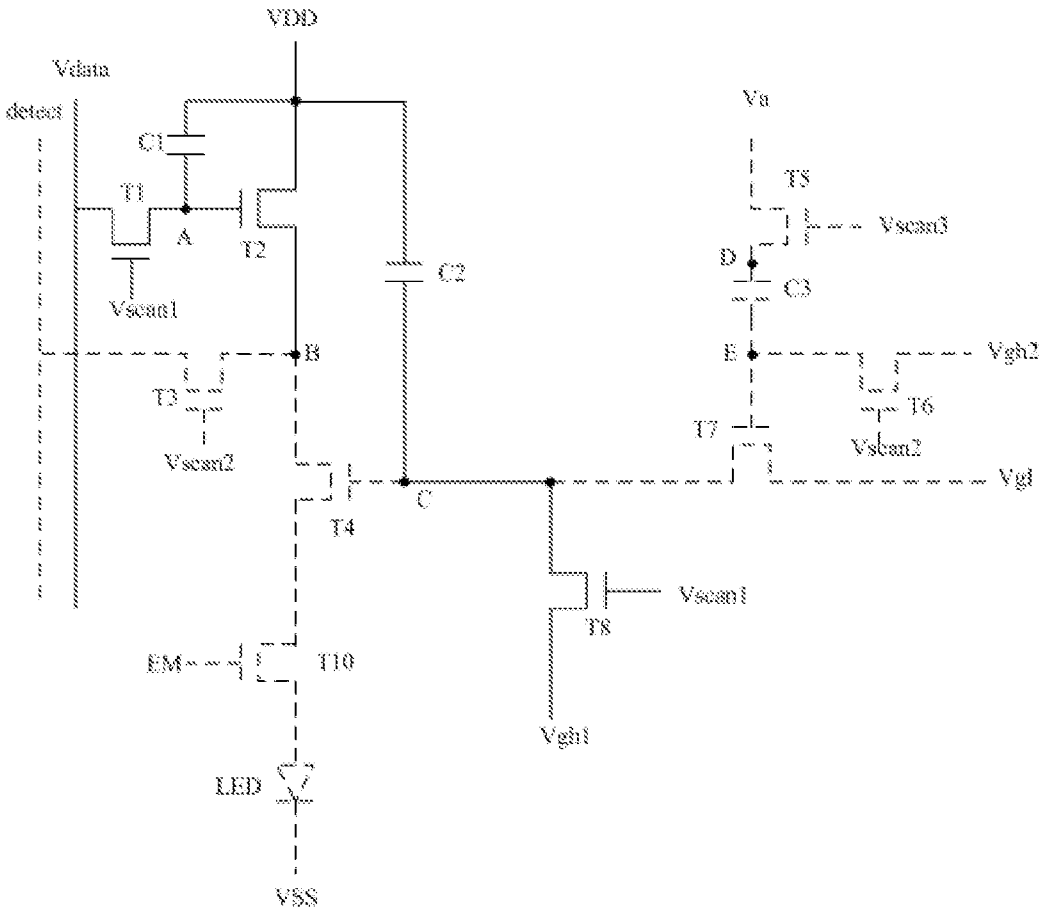
FIG. 4 is an equivalent circuit diagram of a driving method of a first pixel drive circuit in a first stage according to an embodiment of the present disclosure.

Specifically, further referring to FIG. 4, FIG. 4 is an equivalent circuit diagram of a driving method of a first pixel drive circuit in a first stage according to an embodiment of the present disclosure. As shown in FIG. 4, in the first stage, the sixth transistor T1 is turned on and the first transistor T8 is turned on, and the voltage at point A is Vdata and is maintained through the third capacitor C1; the voltage at point C is Vgh1 and is maintained through the first capacitor C2. In this case, the light-emitting element LED does not emit light.

In the second stage, the second scan control line scan2 of an Nth row controls the third transistor T6 to be turned on, and the third voltage Vgh2 of the third signal line gh2 is transmitted through the third transistor T6 to the gate of the second transistor T7 and the first pole plate of the second capacitor C3, to keep the second transistor T7 turned off through the second capacitor C3. In addition, the third scan control line scan3 controls the fourth transistor T5 to be turned on, and a first level voltage Va of the control signal line a is written to the second pole plate of the second capacitor C3 through the fourth transistor and transmitted to the gate of the second transistor T7 through the coupling effect of the second capacitor C3. The first level voltage Va is a negative voltage, i.e. −Va.

Figure 5:
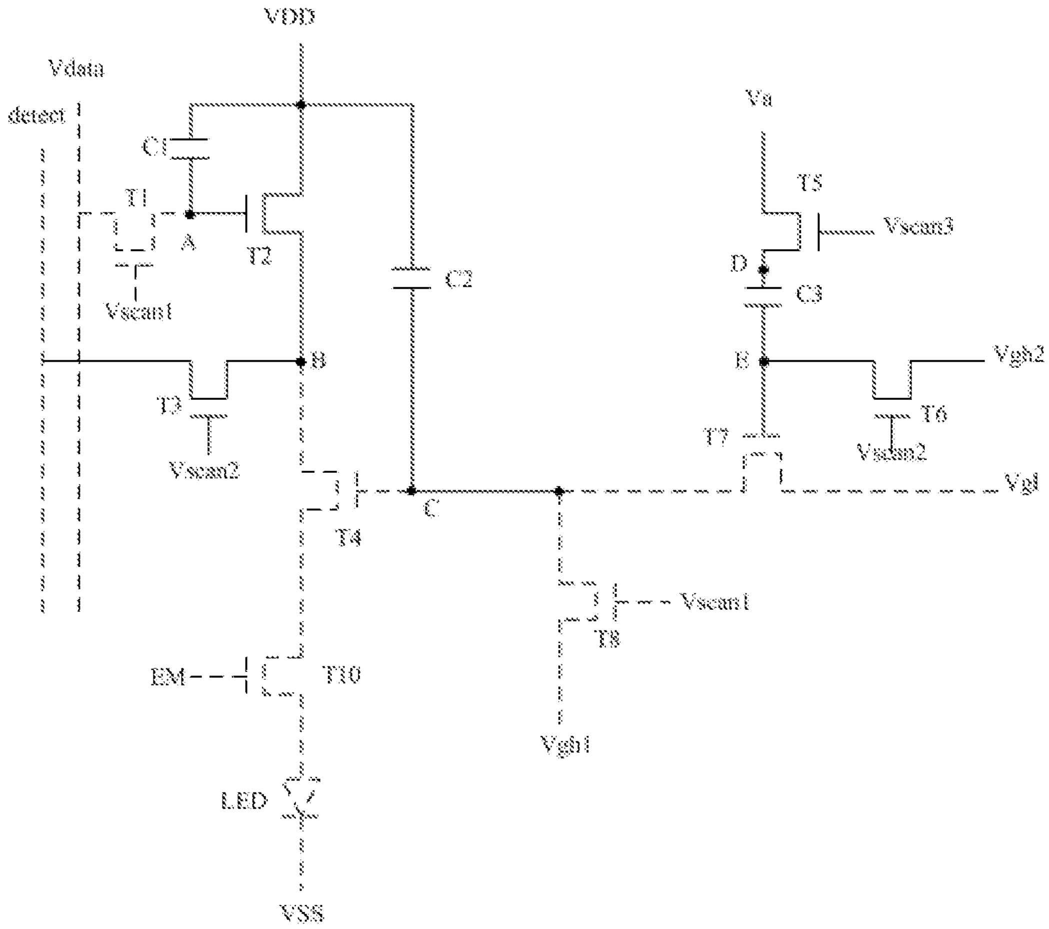
FIG. 5 is an equivalent circuit diagram of a driving method of a first pixel drive circuit in a second stage according to an embodiment of the present disclosure.

Specifically, referring to FIG. 5, FIG. 5 is an equivalent circuit diagram of a driving method of a first pixel drive circuit in a second stage according to an embodiment of the present disclosure. As shown in FIG. 5, the second scan control line scan2 and the third scan control line scan3 are input with low-level voltages to control the third transistor T6 and the fourth transistor T5 to be turned on, respectively. The third voltage Vgh2 of the third signal line gh2 is transmitted to the gate of the second transistor T7 through the third transistor T6, at which time the voltage at point E is Vgh2. At the same time, the fourth transistor T5 is turned on, and at the moment of the fourth transistor T5 being turned on, the voltage at point E is coupled to Vgh2-Va through the second capacitor C3. The turning-on of the third transistor T6 causes the voltage at point E to fall back to Vgh2 rapidly. The Vgh2 is the voltage that keeps the second transistor T7 in the turned-off state. In the embodiments, the third voltage Vgh2 is a positive voltage and the first level voltage Va is a negative voltage.

Since it is possible for Vgh2-Va to be less than 0, such that the second transistor T7 of the P-type is turned on not within expectation, and the second drive transistor T4 may be turned on, causing the light-emitting element LED to emit light. In the embodiments, by arranging the second switch transistor T10 between the second drive transistor T4 and the light-emitting element LED, the power supply line VDD and the light-emitting element LED are thereby controlled to be turned off. In other embodiments, the second drive transistor T4 is prevented from being turned on by arranging the fifth transistor T9 for compensation at the gate of the second drive transistor T4 such that the gate voltage of the second drive transistor T4 is maintained at a voltage that causes turning-off.

In other embodiments, the first level voltage Va may be controlled such that Vgh2-Va is greater than or equal to 0, thereby making the second transistor T7 turned off and controlling the second drive transistor T4 to be turned off, without limitation herein.

In the embodiments, even if the second drive transistor T4 is turned on, the light-emitting element LED does not emit light because the second switch transistor T10 in the turned-off state. When the second transistor T7 is turned on not within expectation, the voltage at point C will change, i.e., the initial voltage at point C does not change from Vgh1 to Vg1 before the start of the light-emitting stage, but from an unknown voltage to Vg1. However, In the embodiments, as shown in FIG. 3, assuming that the second transistor T7 is turned off at the voltage Vgh2-Va, the initial voltage at point C does not change before the light-emitting stage.

In the embodiments, the driving current may be measured by controlling the first switch transistor T3 to be turned on in the second stage. In other embodiments, it is also possible to control the first switch transistor T3 to be turned on in the third stage to measure the driving current, without limitation herein. Specifically, the scan control line is either the second scan control line scant or the third scan control line scan3, or in other embodiments, the scan control line may be a separate control signal line. In the second stage, the scan control line of an Nth row controls the first switch transistor T3 to be turned on such that the drain of the first drive transistor T2 forms a path with the measurement line detect, thereby measuring the driving current of the first drive transistor T2 through the measurement line detect.

In the third stage, the third scan control line scan3 of an Nth row controls the fourth transistor T5 to be turned on, and a second level voltage Va0=0V of the control signal line a is written to the second pole plate of the second capacitor C3 through the fourth transistor and transmitted to the gate of the second transistor T7 through the coupling effect of the second capacitor C3 to turn off the second transistor T7.

Figure 6:
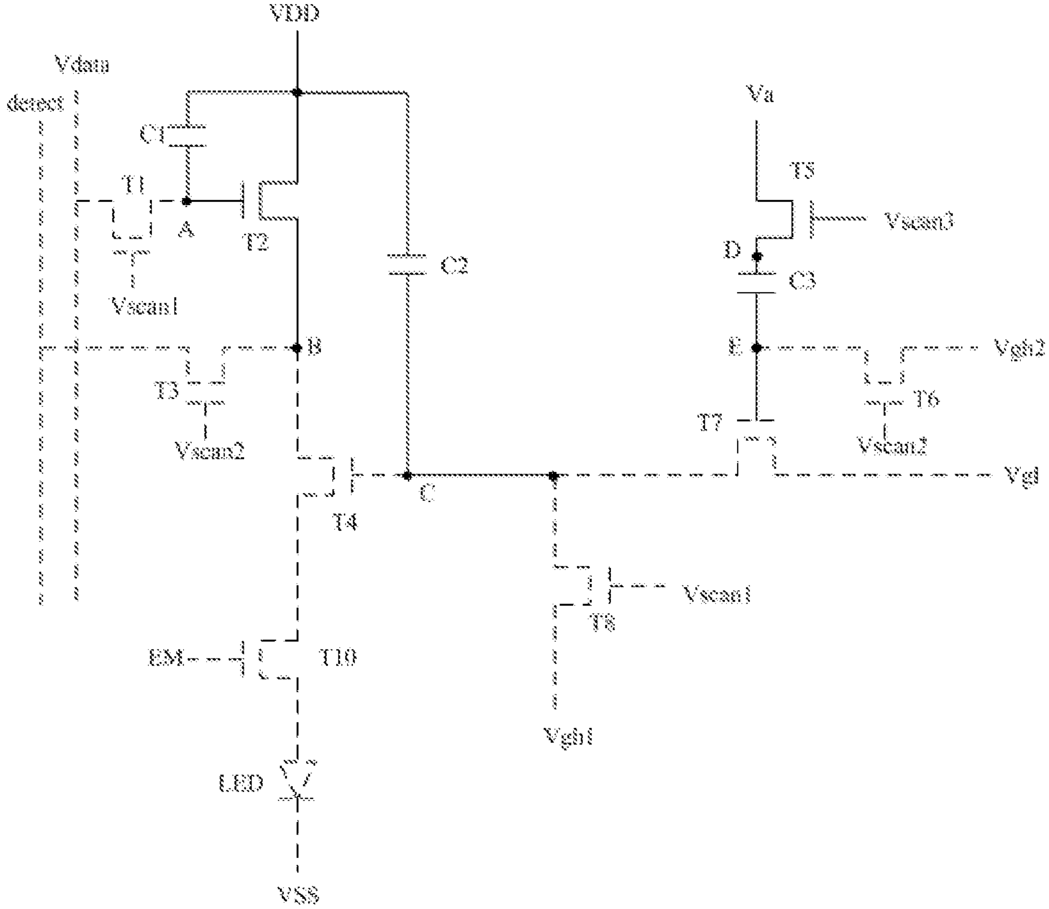
FIG. 6 is an equivalent circuit diagram of a driving method of a first pixel drive circuit in a third stage according to an embodiment of the present disclosure.

Specifically, referring to FIG. 6, FIG. 6 is an equivalent circuit diagram of a driving method of a first pixel drive circuit in a third stage according to an embodiment of the present disclosure. As shown in FIG. 6, the fourth transistor T5 is turned on and other transistors are turned off, that is, the third transistor T6 is turned off, at which time the voltage at point E is maintained at Vgh2. Towards the end of the third stage, the second level voltage is input to the control signal line a, where the second level voltage is the initial potential Va0, which in the embodiments is potential 0. At this time, the voltage of the control signal line a changes from −Va to 0, and the voltage at point E changes to Vgh2+Va due to the capacitive coupling effect. Then the fourth transistor T5 is turned off again. In other embodiments, the second level potential Va0 may not be 0 potential, but it is necessary to ensure that the difference between the first level voltage Va and the second level voltage Va0 is Va, such that the gate voltage of the second transistor T7 (voltage at point E) becomes Vgh2+Va.

In the third stage, the width of the signal change of the control signal line a is less than the width of the third scan control line scan3, as shown in FIG. 3. That is, the moment when the voltage of the control signal line a changes from a low potential to a high potential is earlier than the moment when the third scan control line scan3 changes from a low potential to a high potential, thereby changing the potential at point E from Vgh to Vgh+Va. Further, in the second stage, the moment when the voltage of the control signal line a changes from a high potential to a low potential is later than the moment when the third scan control line scan3 changes from a high potential to a low potential, thereby changing the potential at point E from Vgh2 to Vgh2-Va and further back to Vgh2. In the second stage, the control signal line a and the third scan control line scan3 may change simultaneously, without limitation herein.

In the fourth stage, the third scan control lines scan3 of all rows control the fourth transistor T5 to be turned on, and the swing voltage Vsweep of the control signal line a is transmitted through the fourth transistor T5 to the gate of the second transistor T7 to control the second transistor T7 to be turned on, at which time the second voltage of the second signal line Vg1 is transmitted through the second transistor T7 to the gate of the second drive transistor T4 to control the second drive transistor T4 to be turned on.

In the embodiments, in the fourth stage, the fourth scan control line EM controls the second switch transistor T10 to be turned on such that the light-emitting element LED and the power supply line VDD form a path.

Figure 7:
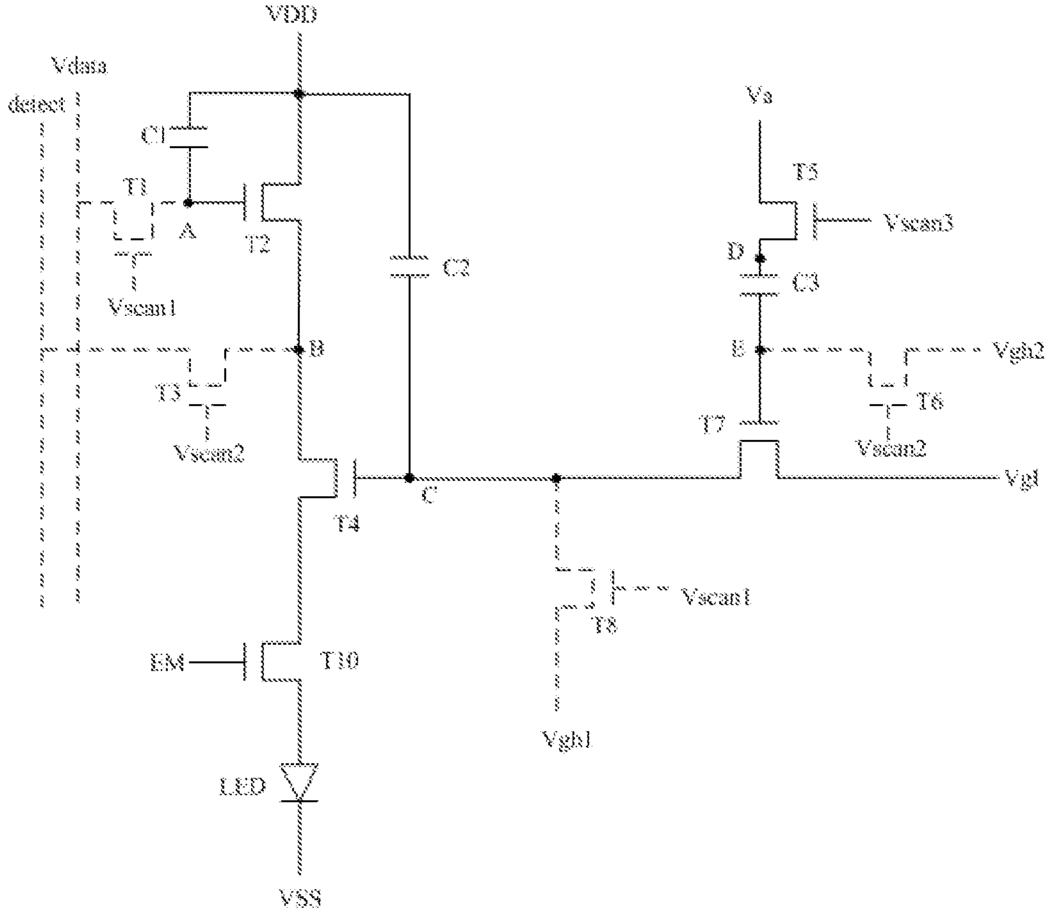
FIG. 7 is an equivalent circuit diagram of a driving method of a first pixel drive circuit in a fourth stage according to an embodiment of the present disclosure.

Specifically, referring to FIG. 7, FIG. 7 is an equivalent circuit diagram of a driving method of a first pixel drive circuit in a fourth stage according to an embodiment of the present disclosure. As shown in FIG. 7, the third scanning control line scan3 controls the fourth transistor T5 to be turned on, the swing voltage Vsweep of the control signal line a controls the second transistor T7 to be turned on, and the second voltage Vg1 of the second signal line g1 controls the second drive transistor T4 to be turned on. The first drive transistor T2 is always turned on in the presence of the third capacitor C1. The fourth scan control line EM controls the second switch transistor T10 to be turned on. The first drive transistor T2 and the second drive transistor T4 and the second switch transistor T10 are turned on, such that the high-potential power supply line VDD flows to the low-potential power supply line VSS and through the light-emitting element LED, causing the light-emitting element LED to emit light.

The swing voltage Vsweep is uniformly rising voltage or uniformly falling voltage, and when rising or falling to a certain value, it reaches a turning-on voltage (Vth) of the second transistor T7 and is maintained by the second capacitor C3, such that the second transistor T7 is always turned on, controlling the second drive transistor T4 to be turned on, such that the light-emitting element LED emits light. When the swing voltage Vsweep returns to −Va potential, the potential at the point E returns to Vgh2 and the second transistor T7 is turned off. At this time, the second drive transistor T4 is in the turned-on state at the second voltage Vg1. Therefore, it is necessary to control the light-emitting element LED not to emit light by controlling the second switch transistor T10 to be turned off. In the embodiments, after the end of luminescence, the voltage at point C remains at Vg1 until the next time the first transistor T8 is turned on, and then becomes Vgh1. The Vgh1 may be zero or positive.

In the fourth stage, the third scan control line scan3 is at a low potential voltage and the fourth transistor T5 is always turned on, such that the swing voltage Vsweep is input to the gate of the second transistor T7.

In the embodiments, when without the second switch transistor T10, the second drive transistor T4 is always turned on at the second voltage Vg1, which can keep the light-emitting element LED in the light-emitting state and thus cannot achieve the purpose of modulating the width. In other embodiments, the second switch transistor T10 may be arranged between the gate of the second drive transistor T4 and the drain of the second transistor T7.

In the embodiments, the second transistor T7 is a P-type transistor, and the swing voltage Vsweep is a uniformly falling voltage. The swing voltage Vsweep is coupled through a capacitor to point E. The voltage at point E is uniformly pulled down, and when the collimation at point E reaches the turning-on voltage of the second transistor T7 (i.e., the threshold voltage Vth), the second voltage Vg1 of the second signal line is written to point C, causing the second drive transistor T4 to be turned on, at which time the loop from VDD to VSS is turned on and the LED emits light. Assuming a uniformly decreasing slope of Vsweep of K and a total time of the light-emitting stage of T0, the light-emitting time is T0−(Vgh2+Va−Vth)/K. The light-emitting time is related not only to K but also to the Va voltage.

Therefore, in a specific embodiment, the Va voltage may be compensated by the control signal line a. Since the first drive transistor T2 and the second transistor T7 are located in the same pixel, the threshold voltages Vth of T2 and T7 are considered to drift to the same extent. In the second stage, when the driving current detection unit compensates for the data line data, it can also compensate for the Va voltage, thereby enabling pulse width modulation.

In other embodiments, when the second transistor T7 is a P-type transistor, the swing voltage Vsweep is a uniformly rising voltage, and the light-emitting time of the light-emitting element LED is also related to the slope of the swing voltage Vsweep. For the analysis process, reference may be made to the above embodiments, which will not be repeated herein.

The beneficial effect of the first embodiment is that the driving current and light-emitting time of the light-emitting element LED in the pixel are adjusted by controlling the gate voltage of the first drive transistor and the second drive transistor, respectively. The driving current of the LED is measured by the driving current detection unit to facilitate subsequent compensation adjustment of the driving current. In addition, the pulse width modulation of the driving current I is achieved by the slope of the swing voltage.

In the embodiments, the control signals of the first scan control line scant, the second scan control line scan2, the third scan control line scan3, the control signal line a, and the fourth scan control line EM are at low-level voltages. In other embodiments, the control signals of the first scan control line scant, the second scan control line scan2, the third scan control line scan3, the control signal line a, and the fourth scan control line EM may be high-level voltages, or partly high-level voltages and partly low-level voltages, depending on the P/N type of the transistor, without limitation herein.

Figure 8:
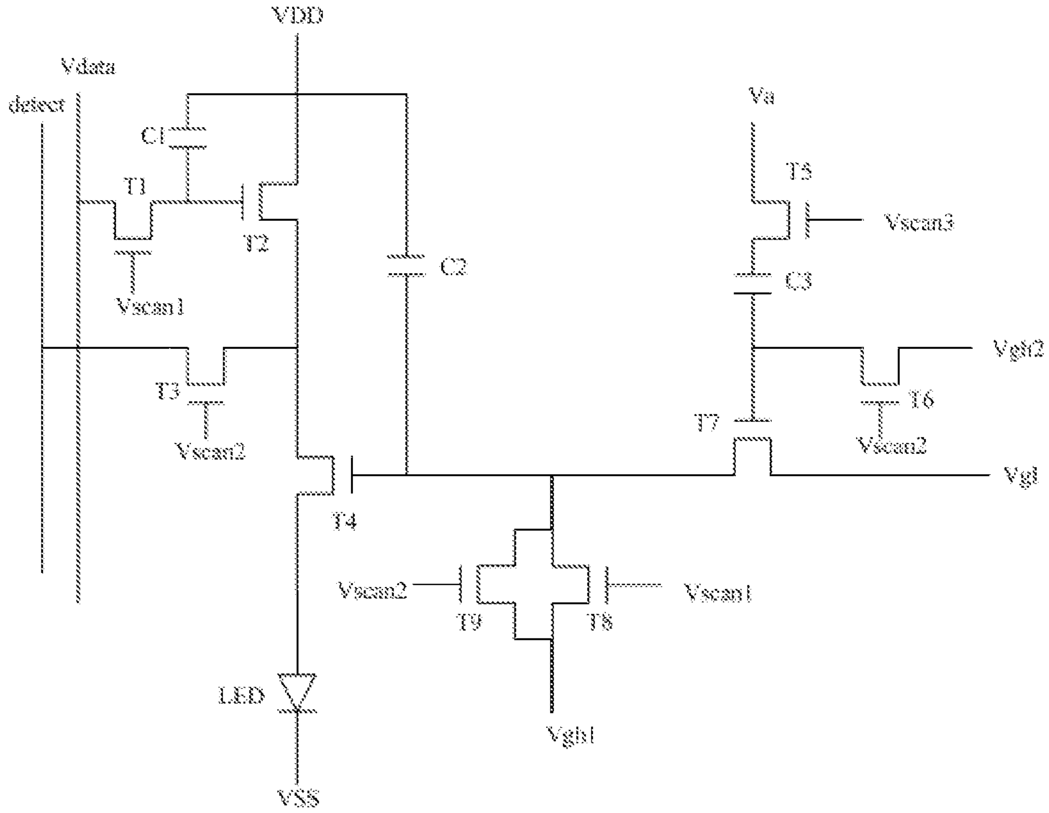
FIG. 8 is a structural schematic view of a pixel drive circuit according to a second embodiment of the present disclosure.

The present disclosure further provides a second pixel drive circuit. Specifically, referring to FIG. 8, FIG. 8 is a structural schematic view of a pixel drive circuit according to a second embodiment of the present disclosure. As shown in FIG. 8, the pixel drive circuit includes a pulse width modulation unit PWM, and the pulse width modulation unit includes a second drive transistor T4, a first transistor T8, a second transistor T7, a third transistor T6, a fourth transistor T5, a first capacitor C2, a second capacitor C3, and a fifth transistor T9.

Specifically, a first pole plate of the first capacitor C2 is connected to a gate of the second drive transistor T4, and a second pole plate of the first capacitor C2 is connected to a high-potential power supply line VDD.

A source of the first transistor T8 is connected to a first signal line gh1, a drain of the first transistor T8 is connected to the gate of the second drive transistor T4 and the first pole plate of the first capacitor C2, and a gate of the first transistor T8 is connected to a first scan control line scant. The first transistor T8 is configured to charge a first voltage gh1 to the gate of the second drive transistor T4, and the first voltage gh1 is maintained through the first pole plate of the first capacitor C2. The first voltage gh1 is configured to turn off the second drive transistor T4.

A source of the second transistor T7 is connected to a second signal line g1, a drain of the second transistor T7 is connected to the gate of the second drive transistor T4, and a gate of the second transistor T7 is connected to a drain of the third transistor T6 and to a first pole plate of the second capacitor C3.

A source of the third transistor T6 is connected to a third signal line gh2, a drain of the third transistor T6 is connected to the gate of the second transistor T7, and a gate of the third transistor T6 is connected to a second scan control line scan2 and to the first pole plate of the second capacitor C3.

A source of the fourth transistor T5 is connected to a control signal line a, a drain of the fourth transistor T5 is connected to a second pole plate of the second capacitor C3, and a gate of the fourth transistor T5 is connected to a third scan control line scan3. The voltage of the gate of the second transistor T7 is adjusted by the third transistor T6 and the fourth transistor T5 cooperatively.

A source of the fifth transistor T9 is connected to the first signal line gh1, a drain of the fifth transistor T9 is connected to the gate of the second drive transistor T4 and to the first pole plate of the first capacitor C2, and a gate of the fifth transistor T9 is connected to the second scan control line scan2.

In the embodiments, by turning on the fifth transistor T9 in a second stage, the fifth transistor T9 is made to be turned on simultaneously with the third transistor T6, such that even if the second transistor T7 is turned on and the second drive transistor T4 is charged with the Vg1 voltage, the gate of the second drive transistor T4 may be charged by the fifth transistor T9 to offset the voltage of the second drive transistor T4, thereby keeping the voltage of the second drive transistor T4 constant.

In the embodiments, the resistance of the fifth transistor T9 is much less than the resistance of the second transistor T7, such that the voltage charged by the second transistor T7 to the second drive transistor T4 flows out through the fifth transistor T9 without causing a change in the gate voltage of the second drive transistor T4.

In the embodiments, the timing diagram of the driving signals of each transistor is similar to that of the first embodiment, and details thereof may refer to FIG. 3, which will not be repeated here.

Figure 9:
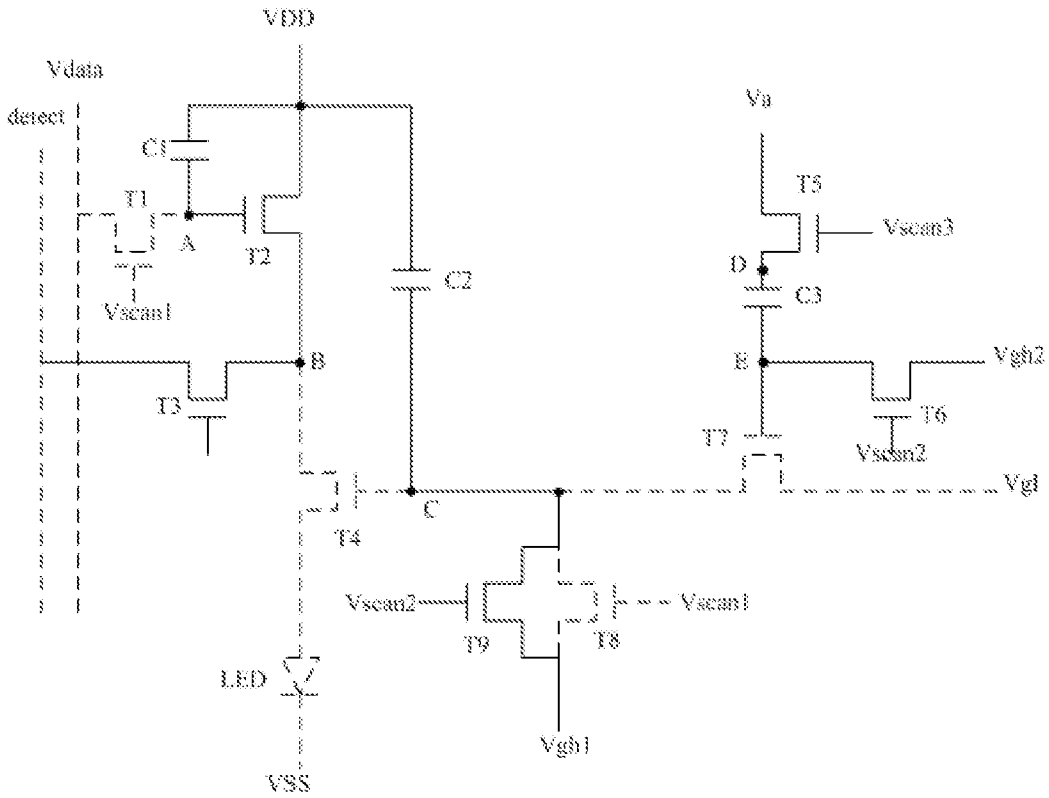
FIG. 9 is an equivalent circuit diagram of a driving method of a second pixel drive circuit in a second stage according to an embodiment of the present disclosure.

In the embodiments, the difference lies only in that the fifth transistor T9 is turned on in the second stage. Specifically, referring to FIG. 9, FIG. 9 is an equivalent circuit diagram of a driving method of a second pixel drive circuit in a second stage according to an embodiment of the present disclosure.

In the second stage, the fifth transistor T9 is controlled to be turned on. In this way, even though T7 is turned on at a certain instant, the potential at point C does not change too much due to the turning-on of the fifth transistor T9, thereby ensuring the turned-off state of the second drive transistor T4. Specifically, the gate of the fifth transistor T9 is controlled by the second scan control line scant to be turned on at the second stage such that the first voltage Vgh1 of the first signal line gh1 is transmitted to the first pole plate of the first capacitor C2 and to the gate of the second drive transistor T4, keeping the voltage of the gate of the second drive transistor T4 from changing abruptly and keeping the second drive transistor T4 being turned on. The conduction of each of the other transistors remains unchanged, as described in the first embodiment.

In the first, third, and fourth stages, the conduction of each transistor remains unchanged, as described in the first embodiment.

In the embodiments, the third scanning control line scan3 controls the fourth transistor T5 to be turned on, the swing voltage Vsweep of the control signal line a controls the second transistor T7 to be turned on, and the second voltage Vg1 of the second signal line g1 controls the second drive transistor T4 to be turned on. The first drive transistor T2 remains in the turned-on state in the presence of the third capacitor C1 until a next data writing stage starts. When the next data writing stage is started, the first scan control line scant controls the first transistor T8 to be turned on, writing an initial voltage to the second drive transistor T4, such that the second drive transistor T4 is turned off and the light-emitting element LED emits light. In the embodiments, the second drive transistor T4 is in an uncontrollable stage between the end of the light-emitting stage and the start of the next writing stage, i.e., the present embodiment is less preferred than the first embodiment.

The beneficial effect of the embodiments is that the PWM is turned on in the light-emitting stage and is off in the non-light-emitting stage by internal compensation of the PWM.

Figure 10:
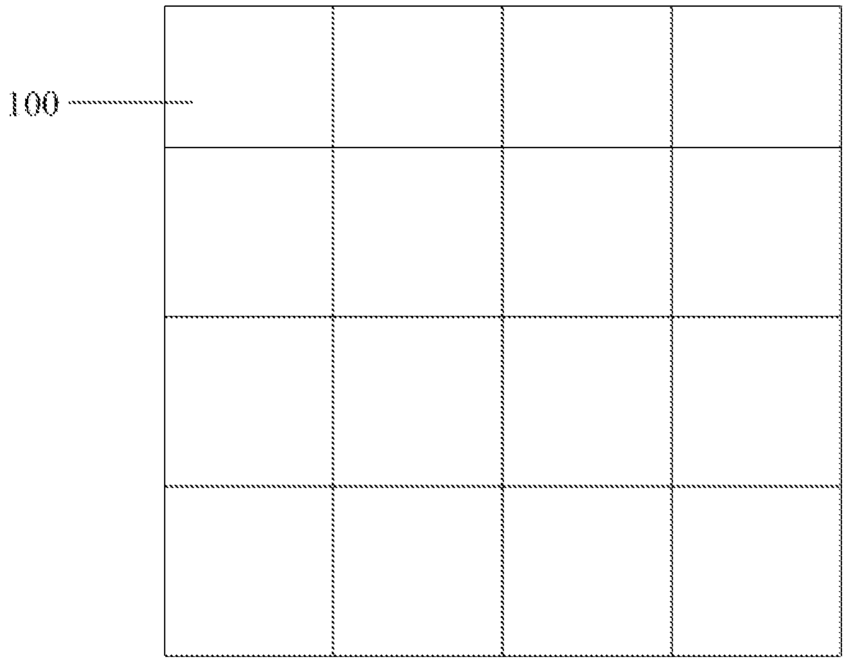
FIG. 10 is a structural schematic view of a display panel according to an embodiment of the present disclosure.

The present disclosure further provides a display panel, the display panel includes multiple pixel cells arranged in an array, and each pixel cell is arranged with the pixel drive circuit in any of the above embodiments. Specifically, referring to FIG. 10, FIG. 10 is a structural schematic view of a display panel according to an embodiment of the present disclosure. As shown in FIG. 10, the display panel includes multiple pixel cells 100, and each pixel cell 100 is arranged with a pixel drive circuit.

The beneficial effect of the present disclosure is that the PAM and PWM modulation of the light-emitting elements in the display panel is realized by 9/10 TFTs and 3 capacitors C and multiple control lines.

The above is only an embodiment of the present disclosure and is not intended to limit the scope of the present disclosure. Any equivalent structure or equivalent process transformation made by using the contents of the specification and the accompanying drawings of the present disclosure, or applied directly or indirectly in other related technical fields, are included in the scope of the present disclosure.

What is claimed is:

1. A pixel drive circuit, comprising:

a light-emitting element;

a power supply line, comprising a high-potential power supply and a low-potential power supply, connected to the light-emitting element;

a pulse amplitude modulation unit, comprising a first drive transistor connected to the light-emitting element and the power supply line; wherein a driving current with different amplitudes is provided to the light-emitting element according to a voltage applied to a gate of the first drive transistor; and a pulse width modulation unit, comprising a second drive transistor connected to the light-emitting element and the pulse amplitude modulation unit; wherein a duration of the driving current of the light-emitting element is controlled according to a voltage applied to a gate of the second drive transistor; wherein the pulse width modulation unit further comprises a first transistor, a second transistor, a third transistor, a fourth transistor, a first capacitor, and a second capacitor; a first pole plate of the first capacitor is connected to the gate of the second drive transistor, and a second pole plate of the first capacitor is connected to the power supply line; a source of the first transistor is connected to a first signal line, a drain of the first transistor is connected to the gate of the second drive transistor, and a gate of the first transistor is connected to a first scan control line; a source of the second transistor is connected to a second signal line, a drain of the second transistor is connected to the gate of the second drive transistor, and a gate of the second transistor is connected to a drain of the third transistor and to a first pole plate of the second capacitor; a source of the third transistor is connected to a third signal line, the drain of the third transistor is connected to the gate of the second transistor and to the first pole plate of the second capacitor, and a gate of the third transistor is connected to a second scan control line; a source of the fourth transistor is connected to a control signal line, a drain of the fourth transistor is connected to a second pole plate of the second capacitor, and a gate of the fourth transistor is connected to a third scan control line.

2. The pixel drive circuit according to claim 1, wherein a source of the first drive transistor is connected to the power supply line, a drain of the first drive transistor is connected to a source of the second drive transistor, and a drain of the second drive transistor is connected to the light-emitting element.

3. The pixel drive circuit according to claim 1, further comprising a driving current detection unit connected to the drain of the first drive transistor and configured to detect a driving current of the first drive transistor;

wherein the driving current detection unit comprises a first switch transistor; a source of the first switch transistor is connected to the drain of the first drive transistor, a drain of the first switch transistor is connected to a measurement line, and a gate of the first switch transistor is connected to a scan control line.

4. The pixel drive circuit according to claim 1, wherein the pulse width modulation unit further comprises a fifth transistor connected in parallel with the first transistor to control a gate voltage of the second drive transistor;

wherein a source of the fifth transistor is connected to the first signal line, a drain of the fifth transistor is connected to the gate of the second drive transistor, and a gate of the fifth transistor is connected to the second scan control line, for maintaining an initial voltage of the gate of the second drive transistor.

5. The pixel drive circuit according to claim 1, further comprising a control unit connected to the light-emitting element and the power supply line, for controlling connection or disconnection of the light-emitting element;

wherein the control unit comprises a second switch transistor; a source of the second switch transistor is connected to the drain of the second drive transistor, a drain of the second switch transistor is connected to the light-emitting element, and a gate of the second switch transistor is connected to a fourth scan control line.

6. The pixel drive circuit according to claim 1, wherein the pulse amplitude modulation unit further comprises a sixth transistor and a third capacitor;

a source of the sixth transistor is connected to a data line, a drain of the sixth transistor is connected to a gate of the first drive transistor and to a first pole plate of the third capacitor, and a gate of the sixth transistor is connected to the first scan control line; a second pole plate of the second capacitor is connected to the power supply line.

7. The pixel drive circuit according to claim 1, wherein each of the first drive transistor, second drive transistor, first transistor, second transistor, third transistor, and fourth transistor is an N-type transistor or a P-type transistor.

8. A driving method of the pixel drive circuit according to claim 1; wherein the pulse amplitude modulation unit further comprises a sixth transistor and a third capacitor; a source of the sixth transistor is connected to a data line, a drain of the sixth transistor is connected to a gate of the first drive transistor and to a first pole plate of the third capacitor, and a gate of the sixth transistor is connected to the first scan control line; a second pole plate of the second capacitor is connected to the power supply line; the driving method comprises:

a first stage, comprising:

controlling, via the first scan control line of an Nth row, the sixth transistor and the first transistor to be turned on;

transmitting a data voltage of the data line through the sixth transistor to the first pole plate of the third capacitor and the gate of the first drive transistor;

maintaining the data voltage through the third capacitor to achieve an amplitude setting of a driving current of the first drive transistor;

transmitting a first voltage of the first signal line through the first transistor to the gate of the second drive transistor and to the first pole plate of the first capacitor; and maintaining the first voltage through the first capacitor to keep the second drive transistor in a turned-off state;

a second stage, comprising:

controlling, via the second scan control line of an Nth row, the third transistor to be turned on;

transmitting a third voltage of the third signal line through the third transistor to the gate of the second transistor and the first pole plate of the second capacitor, to keep the second transistor turned off;

controlling, via the third scan control line, the fourth transistor to be turned on; and writing a first level voltage of the control signal line to the second pole plate of the second capacitor through the fourth transistor and transmitted to the gate of the second transistor through a coupling effect of the second capacitor;

a third stage, comprising:

controlling, via the third scan control line of an Nth row, the fourth transistor to be turned on;

writing a second level voltage of the control signal line to the second pole plate of the second capacitor through the fourth transistor; and transmitting the second level voltage of the control signal line to the gate of the second transistor through the coupling effect of the second capacitor, to turn off the second transistor;

a fourth stage, comprising:

controlling, via the third scan control lines of all rows, the fourth transistor to be turned on;

transmitting a swing voltage of the control signal line through the fourth transistor to the gate of the second transistor to control the second transistor to be turned on; and transmitting a second voltage of the second signal line through the second transistor to the gate of the second drive transistor to control the second drive transistor to be turned on; and controlling a turned-on time of the second transistor through the swing voltage, and controlling a turned-on time of the second drive transistor, thereby controlling a light-emitting time of the light emitting element.

9. The driving method according to claim 8, wherein the second transistor is a P-type transistor, and the swing voltage is a uniformly falling voltage; the light-emitting time is related to a decreasing slope of the swing voltage.

10. The driving method according to claim 8, wherein the second transistor is an N-type transistor, and the swing voltage is a uniformly rising voltage.

11. The driving method according to claim 8, wherein the second or third stage further comprises:

controlling, via the scan control line of the Nth row, the first switching transistor to be turned on, for causing the drain of the first drive transistor to form a path with a measurement line and measuring the driving current of the first drive transistor.

12. The driving method according to claim 11, wherein the scan control line is the second scan control line or the third scan control line.

13. The driving method according to claim 8, wherein the pulse width modulation unit further comprises a fifth transistor; a source of the fifth transistor is connected to the first signal line, a drain of the fifth transistor is connected to the gate of the second drive transistor, and a gate of the fifth transistor is connected to the second scan control line;

wherein the second stage further comprises:

controlling, via the second scan control line of the Nth row, the fifth transistor to be turned on; and transmitting the first voltage of the first signal line to the first pole plate of the first capacitor and to the gate of the second drive transistor, for keeping a gate voltage of the second drive transistor constant.

14. The driving method according to claim 8, wherein the pixel drive circuit further comprises a control unit, the control unit comprising a second switch transistor; a source of the second switch transistor is connected to the drain of the second drive transistor, a drain of the second switch transistor is connected to the light-emitting element, and a gate of the second switch transistor is connected to a fourth scan control line;

wherein the fourth stage further comprises:

controlling, via the fourth scan control line, the second switch transistor to be turned on, for enabling the power supply line to form a path with the light-emitting element and causing the light-emitting element to emit light.

15. A display panel, comprising a plurality of pixel cells arranged in an array; wherein each pixel cell is arranged with a pixel drive circuit;

wherein the pixel drive circuit comprises:

a light-emitting element;

a power supply line, comprising a high-potential power supply and a low-potential power supply, connected to the light-emitting element;

a pulse amplitude modulation unit, comprising a first drive transistor connected to the light-emitting element and the power supply line; wherein a driving current with different amplitudes is provided to the light-emitting element according to a voltage applied to a gate of the first drive transistor; and a pulse width modulation unit, comprising a second drive transistor connected to the light-emitting element and the pulse amplitude modulation unit; wherein a duration of the driving current of the light-emitting element is controlled according to a voltage applied to a gate of the second drive transistor; wherein the pulse width modulation unit further comprises a first transistor, a second transistor, a third transistor, a fourth transistor, a first capacitor, and a second capacitor; a first pole plate of the first capacitor is connected to the gate of the second drive transistor, and a second pole plate of the first capacitor is connected to the power supply line; a source of the first transistor is connected to a first signal line, a drain of the first transistor is connected to the gate of the second drive transistor, and a gate of the first transistor is connected to a first scan control line; a source of the second transistor is connected to a second signal line, a drain of the second transistor is connected to the gate of the second drive transistor, and a gate of the second transistor is connected to a drain of the third transistor and to a first pole plate of the second capacitor; a source of the third transistor is connected to a third signal line, the drain of the third transistor is connected to the gate of the second transistor and to the first pole plate of the second capacitor, and a gate of the third transistor is connected to a second scan control line;

a source of the fourth transistor is connected to a control signal line, a drain of the fourth transistor is connected to a second pole plate of the second capacitor, and a gate of the fourth transistor is connected to a third scan control line.

16. The display panel according to claim 15, wherein a source of the first drive transistor is connected to the power supply line, a drain of the first drive transistor is connected to a source of the second drive transistor, and a drain of the second drive transistor is connected to the light-emitting element.

17. The display panel according to claim 15, wherein the pixel drive circuit further comprises a driving current detection unit connected to the drain of the first drive transistor and configured to detect a driving current of the first drive transistor;

wherein the driving current detection unit comprises a first switch transistor; a source of the first switch transistor is connected to the drain of the first drive transistor, a drain of the first switch transistor is connected to a measurement line, and a gate of the first switch transistor is connected to a scan control line.

18. The display panel according to claim 15, wherein the pulse width modulation unit further comprises a fifth transistor connected in parallel with the first transistor to control a gate voltage of the second drive transistor;

wherein a source of the fifth transistor is connected to the first signal line, a drain of the fifth transistor is connected to the gate of the second drive transistor, and a gate of the fifth transistor is connected to the second scan control line, for maintaining an initial voltage of the gate of the second drive transistor.

19. The display panel according to claim 15, wherein the pixel drive circuit further comprises a control unit connected to the light-emitting element and the power supply line, for controlling connection or disconnection of the light-emitting element;

wherein the control unit comprises a second switch transistor; a source of the second switch transistor is connected to the drain of the second drive transistor, a drain of the second switch transistor is connected to the light-emitting element, and a gate of the second switch transistor is connected to a fourth scan control line.

20. The display panel according to claim 15, wherein the pulse amplitude modulation unit further comprises a sixth transistor and a third capacitor;

a source of the sixth transistor is connected to a data line, a drain of the sixth transistor is connected to a gate of the first drive transistor and to a first pole plate of the third capacitor, and a gate of the sixth transistor is connected to the first scan control line; a second pole plate of the second capacitor is connected to the power supply line.

* * * * *